United States Patent [19]

Harper et al.

[11] 3,972,981

[45] Aug. 3, 1976

[54] METHOD OF PREVENTING GYPSUM SCALE FORMATION IN PHOSPHORIC ACID PLANT FILTERS

[75] Inventors: Douglas Charles Harper, Ipswich; Norman Robinson, Felixstowe; Stanislaw Maria Janikowski, Grimsby, all of England

[73] Assignee: Fisons Limited, London, England

[22] Filed: Oct. 25, 1973

[21] Appl. No.: 409,366

[30] Foreign Application Priority Data
Nov. 8, 1972 United Kingdom............... 51454/72

[52] U.S. Cl................................. 423/320; 423/555
[51] Int. Cl.² ........................................ C01B 25/16
[58] Field of Search ........... 423/167, 321, 555, 320, 423/319, 265, 266

[56] References Cited
UNITED STATES PATENTS

| | | | |
|---|---|---|---|
| 2,448,218 | 8/1948 | Haddon | 423/265 |
| 2,968,528 | 1/1961 | Tuttle et al. | 423/321 |
| 3,192,014 | 6/1965 | Leyshon et al. | 423/320 |
| 3,238,142 | 3/1966 | Perry et al. | 252/358 |
| 3,397,956 | 8/1968 | Buchanan et al. | 423/265 |
| 3,410,655 | 11/1968 | Ruter et al. | 423/265 |
| 3,554,694 | 1/1971 | Barker et al. | 423/321 |
| 3,594,123 | 7/1971 | Encke et al. | 423/320 |
| 3,598,755 | 8/1971 | McBroom et al. | 252/321 |
| 3,645,677 | 2/1972 | Akazawa et al. | 423/320 |
| 3,714,330 | 1/1973 | Barker | 423/321 |
| 3,764,655 | 10/1973 | Ehlers et al. | 423/321 |
| 3,796,790 | 3/1974 | Sirianni et al. | 423/319 |

FOREIGN PATENTS OR APPLICATIONS

| | | | |
|---|---|---|---|
| 880,214 | 1971 | Canada | 423/321 |
| 391,901 | 1957 | Japan | 423/321 |
| 1,113,922 | 1968 | United Kingdom | 423/321 |
| 236,435 | 1969 | U.S.S.R. | 423/321 |

OTHER PUBLICATIONS
Hydrocarbon Processing Magazine, Sept. 1972, p. 314.

Primary Examiner—Oscar R. Vertiz
Assistant Examiner—Eugene T. Wheelock
Attorney, Agent, or Firm—Wenderoth, Lind & Ponack

[57] ABSTRACT

The anti-scaling effect of additives added to control the formation of scale during the washing of calcium sulphate anhydrite or hemihydrate crystals is increased when the additives are added as soon as possible after the wash liquors leave the crystals. The invention is of especial use in the washing of calcium sulphate hemihydrate produced during the production of phosphoric acid and is carried out by adding the additives via the central valve of the rotating pan filter on which the hemihydrate crystals are washed.

4 Claims, No Drawings

METHOD OF PREVENTING GYPSUM SCALE FORMATION IN PHOSPHORIC ACID PLANT FILTERS

The present invention relates to a process for reducing scale formation, notably the formation of calcium sulphate scale during the production of phosphoric acid.

During the production of phosphoric acid by the wet process, calcium sulphate is deposited and separated from the product acid by a filtration step. The filter cake contains entrapped phosphoric acid and the cake is therefore washed, usually in a number of stages, with water and/or dilute phosphoric acid to recover this acid. However, where the calcium sulphate is in the form of the anhydrite or hemihydrate, calcium sulphate dihydrate (gypsum) may be deposited during the washing of the filter cake to form a scale upon the filter and associated pipework which severely hampers efficient operation of the filter. It is then necessary to shut down the plant in order to remove the scale. In order to reduce the scale formation it has been proposed to add anti-scaling additives, such as anionic or non-ionic surface-active agents, to the slurry of crystals in phosphoric acid which is to be filtered or to the wash liquors used to wash the crystals after they have been separated from the phosphoric acid.

We have now found that the point of incorporation of the additive affects the extent of scale inhibition achieved. If the additive is added to the liquors separated from the crystals during the washing process as soon as possible after separation has taken place, then in general the amount of scale which is formed is reduced when compared with that formed when the additive is added to the wash liquors and this enables the filter or other separation device to be operated for longer periods before it becomes necessary to carry out a descaling operation.

Accordingly, the present invention provides in a process in which crystals of calcium sulphate anhydrite and/or calcium sulphate hemihydrate are washed with a circulating liquor containing an anti-scaling additive, the improvement which comprises incorporating the anti-scaling additive into the liquor between the point at which it is separated from the crystals and the point at which it is collected for recirculation. Preferably the anti-scaling additive is incorporated as soon as is feasible after the liquor has been separated from the crystals.

The invention may be applied to reducing scale formation during the washing of crystals from a variety of sources, but is of especial use in reducing scale formation in the washing of crystals obtained during the production of phosphoric acid by a hemihydrate process, such as that described and claimed in our British Patent No. 1135951. The invention therefore also provides in a process for producing phosphoric acid by the wet process wherein a slurry of calcium sulphate hemihydrate and/or calcium sulphate anhydrite crystals in phosphoric acid is formed and the crystals are separated from this slurry and are washed with a circulating liquor which contains an anti-scaling additive, the improvement which comprises incorporating the anti-scaling additive into the liquor between the point at which it is separated from the crystals and the point at which it is collected for recirculation.

The washing may be carried out by a variety of methods. Thus, the crystals may be slurried with the wash liquor and the washed crystals separated from the liquor by means of a centrifuge or by decantation. However, it is preferred to carry out the washing by passing wash liquors through a cake of crystals on a filter, preferably a vacuum filter and, for convenience, the invention will be described in terms of this preferred form of operation.

In a vacuum filter, the point at which the filtrate (i.e. the liquor after it has been separated from the crystals) is deemed to be collected for recirculation is the seal box.

In the process of the present invention the anti-scaling additive is added to the filtrate as soon as is practicable after the filtrate leaves the crystals. This may be achieved by the addition of the additive to a port in the central valve beneath the filter pan of a rotating pan filter through which the filtrate passes on its way to the seal box in which it is collected and from which it is recycled to act as wash liquor for an earlier wash stage on the filter. The addition is preferably made only to those filtrates containing low $P_2O_5$ concentrations, i.e. less than 30% by weight of $P_2O_5$. Thus, in a three wash stage filtration, the additive will be added through ports in the central valve to the filtrates from the last two washes. Alternatively, the additive may be added to the filtrate take-off line between the filter pan and the central valve, or to the down pipe from the central valve to the seal box.

Rotating pan filters, their construction and use are well known and various forms are commercially available. The necessary modification required to permit addition of the additive is readily made. In the case of addition to a central valve, all that will normally be required is the drilling of ports through the wall of the stationary portion of the valve to permit addition of the additive to the passages in the valve carrying the filtrates to be treated. Addition of the additive is conveniently achieved by means of a dosing pump. Valve means may also be provided to control the rate of intake of additive into each port in the central valve, e.g. if independantly variable rates of addition to several filtrates are required. It will be appreciated that other types of filter may be used during the washing of crystals. Thus, the process may be applied to a belt filter, e.g. a Landskrona type of filter, in which case the additive is, for example, injected into the filter tray beneath the filter gauze or into the vacuum boxes; or may be applied to a drum type filter.

Whilst the degree of scale inhibition achieved will in general vary directly with the amount of additive used and may be up to twice that achieved when the additive is added to the seal box or later, commercial factors will dictate an upper limit. We prefer to use a concentration of 1% by weight or less, e.g. 0.0005 to 0.2, preferably 0.005 to 0.05% of the additive based on the weight of the filtrate to be treated. Suitable concentrations for addition to the filtrates are from 0.005 to 0.10% by weight.

A specific example of the addition of the additive to a series of washing stages is the addition of the additive to the passages in a central valve serving the last two stages in a three or four stage washing process so as to provide between 0.005 and 0.1% by weight of the additive in the filtrates from the last two washes respectively.

The additive is conveniently added to the filtrate in the form of an aqueous concentrate, e.g. containing 30% by weight or more of the active ingredient.

By addition of the additive to the filtrate as soon as is feasible after it is obtained, scale prevention throughout the wash system is aided, thus enabling prolonged operation of the process before it becomes necessary to carry out descaling; there is uniform distribution of the additive in the filtrate; and smaller amounts of additive are required to achieve the same extent of scale inhibition than is the case where the additive is added significantly after the filtrate is obtained, e.g. when added to the wash liquor seal box.

Apart from the use of the additive, the washing of the crystals is carried out in known manner, although it may be possible to use a wider range of temperatures during the washing process than hitherto, e.g. from 20° to 90°C, preferably 50° to 80°C.

Anti-scaling additives for present use include anionic and/or non-ionic surface-active agents. Suitable anionic surface-active agents are of the alkaryl sulphonic acid salt type.

The alkylaryl sulphonic acids for present use may be derived from mono- or polybenzenoid compounds, e.g. alkylbenzene or alkylnaphthalene compounds, and may possess one, or two or more alkyl groups. The alkyl groups may be straight or branched and preferably contain more than 8 carbon atoms, e.g. 8 to 18 carbon atoms. Thus, the alkyl group may be derived from the condensation of an olefin, e.g. of four molar proportions of propylene; or has a straight chain, e.g. a lauryl group. Mixtures of alkylaryl sulphonates in which the alkyl group has a chain length which varies about a desired mean length may be used, as is the case when the alkyl group is derived from an olefin condensate. Mixtures of different sulphonic acids may be used.

Preferred sulphonic acids for present use include monoalkyl benzene sulphonic acids, e.g. octyl-, nonyl-, decyl-, dodecyl- and hexadecylbenzene sulphonic acids.

The sulphonic acids may be used as the free acid or as a derivative thereof, such as an amide or a lower alkyl, e.g. methyl or ethyl, ester thereof. However, it is preferred that they be used in the form of a salt, e.g. an alkali-metal, notably sodium or potassium, or ammonium salt or an amine salt, e.g. triethanolamine, thereof. Preferred sulphonic acid salts for present use are those sold under the Trade Names Teepol 514 and Nansa S40/S.

Other anionic surface-active agents suitable for present use are those of the empirical general formula

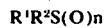    I wherein $R^1$ is an alkyl or aralkyl group; $n$ has a value of 3 or 4; $R^2$ is hydrogen or, when $n$ is 4, $R^2$ is $R^1$ or hydrogen; and derivatives thereof.

The compound of general formula I contains at least one group $R^1$. This is an alkyl group which may be straight or branched and may carry substitutents thereon such as hydroxyl, carbonyl oxygen or sulphonic acid groups. The alkyl chain may also be interrupted by one or more ethylenic or ether linkages. Alternatively, $R^1$ may be an aralkyl group such as a benzyl or alkylbenzyl group. It is preferred that the aryl moiety of the aralkyl group be an alkyl phenyl group in which the alkyl group contains from 8 to 18 carbon atoms, notably a nonyl phenyl group. The group $R^2$ may be hydrogen or an $R^1$ group depending upon the value of $n$.

The compounds of formula I for present use thus include:
 a. mono- and di-alkyl sulphate esters;
 b. sulphate esters of alkylene oxide condensates with alcohols, glycols or alkyl phenols;
 c. alkane sulphonates; and
 d. mixture of these.

The alkyl sulphates for present use may possess one or two alkyl groups. The alkyl groups may be straight or branched, may be saturated or unsaturated and preferably contain more than 8 carbon atoms, e.g. 8 to 18 carbon atoms. The alkyl groups may be derived from the condensation of an olefin, e.g. of four molar proportions of propylene. Specific examples of suitable alkyl groups include 2-ethyl-hexyl, lauryl, propylene tetramer groups. Mixtures of alkyl sulphates in which the alkyl groups have chain lengths which vary about a desired mean length, may be used, as is the case when the alkyl group is derived from an olefin condensate.

Typical alkyl sulphates for present use include mono- or di-octyl-, nonyl-, decyl-, dodecyl- and hexadecyl sulphates.

Sulphate esters of alkylene oxide condensates for present use include sulphate mono-esters of alkylene oxide condensate type non-ionic surface-active agents, notably alkylene oxide condensates with alkanols or alkylphenols. Preferred alkylene oxides are ethylene, propylene or butylene oxides or mixtures thereof. The alcohols with which these are condensed may be mono-hydric or polyhydric, preferably containing 2 or 3 hydroxyl groups, and are primary or secondary alkanols in which the alkyl groups is straight or branched and preferably contains more than 8 carbon atoms, e.g. 8 to 18, preferably 12 – 15 carbon atoms. Mixture of alcohols or glycols in which the chain length of the alkyl group varies about a desired mean length may be used, as is the case when they are derived from an olefin condensate. The alkyl phenol with which the alkylene oxide is condensed may contain one or more alkyl groups of the above types. The phenol moieties may have contained one or more phenolic OH groups, each or only some of which have been condensed with the alkylene oxide moieties. Mixtures of different non-ionic surface-active agents may be used.

Examples of non-ionic surface-active agents whose sulphate esters are suitable for present use include polyalkylene ether alcohols, e.g. those derived from 4 to 14 mols of ethylene oxide and a $C_{8-14}$ alcohol, or octyl- or nonyl phenol condensed with from 3 to 30 molar proportions of ethylene oxide.

The alkane sulphonates for present use include those of the general formulae:

    II

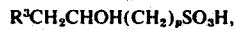    III

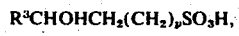    IV and
    V wherein $R^3$ is an alkyl chain optionally interrupted by one or more ethylenic and/or ether linkages and optionally carrying one or more hydroxyl, carbonyl oxygen or —$SO_3H$ group substituents, and p has a value of from 0 to 11.

It is preferred that the alkyl groups to which the —SO₃H are bonded contain from 5 to 21, notably from 11 to 18, carbon atoms. Furthermore, it is not necessary that the —SO₃H group be bonded to the terminal carbon atom of the chain, but it may form part of a side chain. Thus, compounds of formula V may be made by the chlorsulphonation of a saturated hydrocarbon followed by hydrolysis to give a product of the typical formula

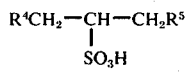

$$R^4CH_2-CH-CH_2R^5$$
$$|$$
$$SO_3H$$

where $R^4$ is an alkyl group and $R^5$ is hydrogen or an $R^4$ group. On the other hand where an α olefin is sulphonated the product, after hydrolysis, will be a mixture of compounds of formulae II, III and IV in which the —SO₃H group is attached to the terminal carbon atom.

Preferred alkane sulphonates for present use are the products obtained by the sulphonation of $C_{14}$-$C_{18}$ α olefins or of a mixture of substantially straight chain alkanes having an average chain length of from 8 to 18, notably 12 to 14 carbon atoms.

It will be appreciated that the compound of formula I may be used in the form of a derivative thereof, e.g. as an alkalimetal salt, notably a sodium or potassium salt, or ammonium salt thereof, e.g. a sodium salt of a sulphonic acid or a sulphonic acid or a sodium salt of a sulphate mono-ester.

Suitable non-ionic surface-active agents for present use include condensates of ethylene, propylene or butylene oxides or mixtures thereof. The alcohols with which these are condensed may be monohydric or polyhydric, preferably containing 2 to 3 hydroxyl groups, and are primary or secondary alkanols in which the alkyl group is straight or brahcned and preferably contains more than 8 carbon atoms, e.g. 8 to 18, preferably 12 – 15 carbon atoms; or are polyalkylene ether glycols obtained from the condensation of one or more alkylene oxides with an alcohol or glycol. The alkyl group may be derived from the condensation of an olefin, e.g. of four molar proportions of propylene; or is a straight chain e.g. a lauryl group. Mixtures of alcohols or glycols in which the chain length of the alkyl group varies about a desired mean length may be used, as is the case when they are derived from an olefin condensate. The alkyl phenol with which the alkylene oxide is condensed may contain one or more alkyl groups of the above types. The phenol moieties may have contained one or more phenolic OH groups, each or only some of which have been condensed with the alkylene oxide moieties. Mixtures of different non-ionic surface-active agents may be used.

Examples of non-ionic surface-active agents for present use include polyalkylene ether alkanols, e.g. those derived from 4 to 14 mols of ethylene oxide and a $C_{8-12}$ alcohol; and octyl- or nonyl phenol condensed with from 5 to 15 molar proportions of ethylene oxide.

The non-ionic surface-active agents may possess free OH groups or these may be in the form of a derivative thereof, e.g. an ester such as an acetate ester thereof.

They may also be used in the form of the alkali-metal, e.g. sodium or potassium, salts thereof.

Mixtures of anionic and nonionic surface-active agents may be used and, indeed, we have found that this is often advantageous since the mixtures may exhibit synergistic effects. A mixture of an alkylbenzene sulphonate with an ethylene oxide condensate of an alkylphenol in weight proportion of from 50 to 80% of the anionic to from 50 to 20% of the nonionic surface-active agent is preferred. Particularly preferred are mixtures of one or more sodium straight chain monononyl, undecyl or dodecyl benzene sulphonates with a condensate of mono-octyl or nonyl phenol with 8 to 14, e.g. 9, molar proportions of ethylene oxide or mixtures of one or more such benzene sulphonates with ethylene oxide condensates with long chain ($C_{12}$-$C_{15}$) secondary alcohols. These mixtures desirably contain the anionic and non-ionic ingredients in weight proportions of from 7:3 to 6:4.

Other suitable anti-scaling additives for present use include certain flocculating agents and condensed phosphates with $M_2O/P_2O_5$ molar ratios of less than 2:1, preferably 1.5:1 to 1:1 e.g. 1.0:1 to 1.2:1 notably about 1.1:1, M being hydrogen or an alkali metal, notably potassium or sodium, such as sodium pyrophosphate, sodium metaphosphate or sodium tripolyphosphate. Condensed phosphates having an $M_2O$:$P_2O_5$ molar ratio of substantailly 1.1:1 may also be used at other points in the washing process, and this use of the condensed phosphates provides another aspect of the invention. In this other aspect of the invention the formation of scale is inhibited by having the phosphate additive present in the liquid phase contacted with the crystals, e.g. by the addition of the additive to a liquor already in contact with the crystals, as is the case where the additive is added to a slurry of hemihydrate crystals in phosphoric acid produced during the acidulation of phosphate rock; and/or by the treatment of the crystals with a liquor containing the additive, as is the case when the latter is added to the wash liquors. Whilst there is no upper limit to the amount of condensed phosphate added in this other aspect of the invention, we have found that these condensed phosphates are more effective on a weight for weight basis than many other anti-scaling additives, notably other condensed phosphates. For commercial reasons we prefer to use a concentration of 1.0% by weight or less, e.g. 0.001 to 0.5 preferably 0.002 to 0.2, of the additive based on the weight of the liquid phase. A specific example of this other aspect of the invention is the addition of the additive to the wash liquor seal boxes of the last two stages in a four stage washing process so as to provide between 0.001 to 0.05. by weight of the additive in the wash liquors. If desired, some additive, e.g. up to about filtered 0.1% by weight, may be added to the water fed to the fourth washing stage. The flocculating agents for present use are those which are not degraded to any appreciable extent over 5 minutes at 50°C in phosphoric acid of 15% $P_2O_5$ and may be selected from a range of materials prossessing this stability to phosphoric acid. It is preferred that the flocculating agent be primarily non-ionic or anionic in nature and neutral or acidic in nature, e.g. a 10% solution of the agent has a pH in the range 3 to 8. Preferred flocculating agents include high molecular weight polymers e.g. polyacrylamides and derivatives thereof. Mixtures of compatible flocculating agents may be used.

The anti-scaling additives for present use are known materials and many are commercially available materials. These commercially available materials may be used in their commercially available forms and purity. The amounts of additive to be used quoted above are therefore given in terms of the active ingredient.

As indicated above, whilst the invention is of especial use in reducing the deposition of gypsum scale during the washing of the hemihydrate filter cake in a wet process for the production of phosphoric acid, it may of course also be applied to other processes where formation of calcium sulphate scale during the washing of hemihydrate occurs. In such cases the washing of the hemihydrate crystals will be carried out essentially as described above.

We believe that central valves for use in rotating pan type vacuum filters which have been modified by the drilling of ports through the walls thereof so as to permit injection of an additive into a stream of filtrate flowing through the valve are novel. The invention therefore also provides a valve block for use in the central valve of a rotating pan type of filter which block has longitudinal bores therethrough and has been modified by the provision of a port through a side wall thereof whereby an additive may be fed to a longitudinal bore. The invention also provides a rotating pan type of filter which is provided with a modified central valve block of the invention.

The invention will now be illustrated by the following Examples in which all parts and percentages are by weight unless otherwise stated:

EXAMPLE 1

The formation of scale was determined in a test rig where a sample of hemihydrate filter cake, obtained during the preparation of phosphoric acid from Togo rock, was washed with a series of washes and the filtrate from each wash collected. Each filtrate was stood for 4 hours to permit development of scale and the extent of scale formation was assessed in terms of the dry weight of solids deposited during this time. Successive washes of the filter cake contained progressively smaller amounts of phosphoric acid therein, so as to simulate as closely as possible the washing conditions which would be used during a multi-stage continuous washing operation of a filter in a commercial process.

A slurry was prepared at room temperature by mixing 184 parts of hemihydrate into phosphoric acid (345 parts, 62.5% $P_2O_5$) sulphuric acid (9.2 parts, 100% $H_2SO_4$) and water (82 parts and heated to 95°C. This slurry was filtered under vacuum and the filtrate discarded. The filter cake was then washed with 123 parts of phosphoric acid (18% $P_2O_5$) at 55°C and the filtrate again discarded. The filter cake was then washed with 135 parts of 10% $P_2O_5$ phosphoric acid at 55°C and the filtrate collected, as wash 1. The filter cake was finally washed with 92 parts of water at 55°C and the filtrate collected (wash 2).

All the individual filtrates were stood in covered beakers for 4 hours at room temperature to permit scale to develop. At the end of this time the scale was scraped from the beaker, washed in acetone, air dried and weighed.

The above test was carried out with additive added to the wash liquors (test A); then with additive added to the filtrates obtained from each wash (thus simulating addition to the central valve of a filter) - test B. The results are set out below. When no additive was present 0.32 gs and 0.07 gs scale formed in washes 1 and 2 respectively.

| Additive | Amount of additive added p.p.m w/w | Reduction in weight of scale formed in gs between Tests A and Tests B | |
|---|---|---|---|
| | | Wash 1 | Wash 2 |
| Sodium dodecyl benzene sulphonate | 100. | 0.200 | 0.047 |
| Comprox (a 70:30 w/w mixture of sodium dodecyl benzene sulphonate and nonyl phenol condensed with 9 mols of ethylene oxide | 100. | 0.192 | 0.005 |
| Teepol CH53 (a 70:30 w/w mixture of sodium laurylbenzene sulphonate and nonyl phenol condensed with 8 to 9 mols of ethylene oxide | 100. | 0.192 | 0.022 |

EXAMPLE 2

The process of Example 1 was repeated using different amounts of additives. The results are set out below.

| Additive | Amount of additive used in ppm w/w | Difference in weight of scale formed in gs. between Tests A and Tests B | |
|---|---|---|---|
| | | Wash 1 | Wash 2 |
| Sodium dodecyl benzene sulphonate | 50 | 0.210 | 0.063 |
| Teepol CH53 | 200 | 0.172 | 0.004 |
| Comprox | 50 | 0.201 | 0.024 |
| | 200. | 0.168 | 0.010 |

EXAMPLE 3

The process of Example 1 repeated with a number of other additives and the results are set out below.

| Additive | Amount of additive used in p.p.m w/w | Difference in weight of scale formed in gs. between tests A and tests B | |
|---|---|---|---|
| | | Wash 1 | Wash 2 |
| Sodium xylene sulphonate | 200. | 0.110 | 0.020 |
| Sodium octyl sulphonate | 100. | 0.090 | 0.010 |
| Teepol 610 (a dialkyl sulphate) | 200. | 0.085 | 0.013 |
| Sodium lauryl sulphate | 50. | 0.040 | 0.043 |
| Condensed phosphate $Na_2O:P_2O_5$ molar ratio 1.1:1 | 200. | 0.065 | 0.008 |
| Condensate of nonyl phenol with 9 mols of ethylene oxide. | 200. | 0.070 | 0.010 |
| Condensate of a secondary alcohol with 9 mols of ethylene oxide sold under the Trade Name of NID 1000 B | 200. | 0.090 | 0.040 |
| Sodium salt of the sulphate ester of an alkyl phenol condensed with about 8.5 mols of ethylene oxide sold under the Trade Name of Solumin FP 855D | 200. | 0.050 | 0.020 |
| Polyacrylate modified with non-ionic amide groups sold under the Trade Name Polyflox 8NP | 200. | 0.080 | 0.010 |

These results show that in all cases there was a significant reduction in the weight of scale formed in Test B as compared to that formed in Test A. In the case of the condensed phosphate, the amount of scale formed in Test A was significantly less than that noted in Test A for the other additives.

We claim:

1. In a process for producing phosphoric acid by the wet process in which a slurry of calcium sulphate hemihydrate crystals in phosphoric acid is produced, which slurry is then filered on a rotating pan type vacuum filter and then washed with a liquor in a number of stages, the improvement which comprises incorporating an additive selected from condensed phosphates having an $M_2O:P_2O_5$ molar ratio of from 1:1 to 1.5:1 in which M is hydrogen or an alkali-metal into the slurry before filtration or into the liquor between the point at which it is separated from the crystals and at the point at which it is re-applied to the crystals.

2. The process of claim 1, wherein the additive is an alkali-metal condensed phosphate and has an $M_2O:P_2O_5$ molar ratio of about 1.1:1.

3. The process of claim 2, wherein the additive is added only to those liquor streams which contain less than 30% $P_2O_5$.

4. In a process for producing phosphoric acid by the wet process in which a slurry of calcium sulfate hemihydrate crystals in phosphoric acid is produced, this slurry is filtered on a rotating pan type vacuum filter and then washed with a liquor in a number of stages, which liquor is circulated from one wash stage to the preceding wash stage, the improvement which comprises incorporating an additive selected from condensed phosphates having an $M_2O:P_2O_5$ molar ratio of about 1.1:1 in which M is hydrogen or an alkali-metal into the liquor between the point at which it is separated from the crystals and the point at which it is collected for circulating back to the crystals.

* * * * *